April 6, 1948.   A. S. GRZECH ET AL   2,439,085
AUTOMATIC ANTITIP DEVICE
Filed April 9, 1947   2 Sheets-Sheet 1

INVENTOR.
ALBERT S. GRZECH
JAMES G. DEBELIUS
BY Howard J. Whelan.

April 6, 1948.  A. S. GRZECH ET AL  2,439,085
AUTOMATIC ANTITIP DEVICE
Filed April 9, 1947  2 Sheets-Sheet 2

INVENTOR.
ALBERT S. GRZECH
JAMES G. DEBELIUS
BY Howard J. Whelan.

Patented Apr. 6, 1948

2,439,085

UNITED STATES PATENT OFFICE 2,439,085

AUTOMATIC ANTITIP DEVICE

Albert Samuel Grzech and James G. Debelius, Baltimore, Md.

Application April 9, 1947, Serial No. 740,453

6 Claims. (Cl. 298—17)

1

This invention refers to vehicles and more particularly to means for preventing loading or unloading trucks, from tipping over during such loading or unloading, and causing incident damage to the load or injury to the operators concerned.

There have been various forms of supports used on trailers attachable to automotive tractor equipment that are used for supporting their bodies when they are detached from the equipment. The supports take the place of the wheels on which the front portion of the truck body is supported while running along the highway. These supports are operated independently of the general operating mechanism of the truck equipment and are controlled mainly by the user after the truck is stopped. The truck bodies in such cases are not suitable for travelling on the highway by themselves. They are not designed to anticipate the possible tilting of the bodies should the shifting of the load to the back tend to do this.

However trucks themselves, as distinct from trailers, do not have any provision for support independent of the wheels.

It is therefore an object of this invention to provide a new and improved anti-tilt mechanism for trucks and tractors that will avoid the disadvantages and limitations of the prior art.

Another object of the present invention is to provide a new and improved anti-tilt mechanism for a truck that will be usable with dump mechanism and operate automatically in conjunction with same to prevent the tilting or tipping of the truck out of its normal horizontal position on the roadway when loads are being discharged and the weight of same shifted to the rear or other portions during the unloading or loading.

A further object of the invention is to provide a new automatic and improved anti-tilt mechanism for trucks that will operate effectively and through the use of the dumping mechanism of the truck in cooperative timing with such, and yet have a structure that is relatively simple in form and parts and economical to manufacture.

Other objects will become apparent as the invention is more fully set forth.

For a clearer understanding of the invention and the objects thereof reference is made to the attached drawings, which illustrate a particular form of the invention. The drawings in conjunction with the following description outline this particular form as an example of the invention to identify its main principles and the purposes for which it may be used and the manner in which

2 it operates. The scope of the invention is emphasized in the claims.

Referring to the drawings.

Similar reference characters refer to similar parts throughout the drawings.

Figure 1:
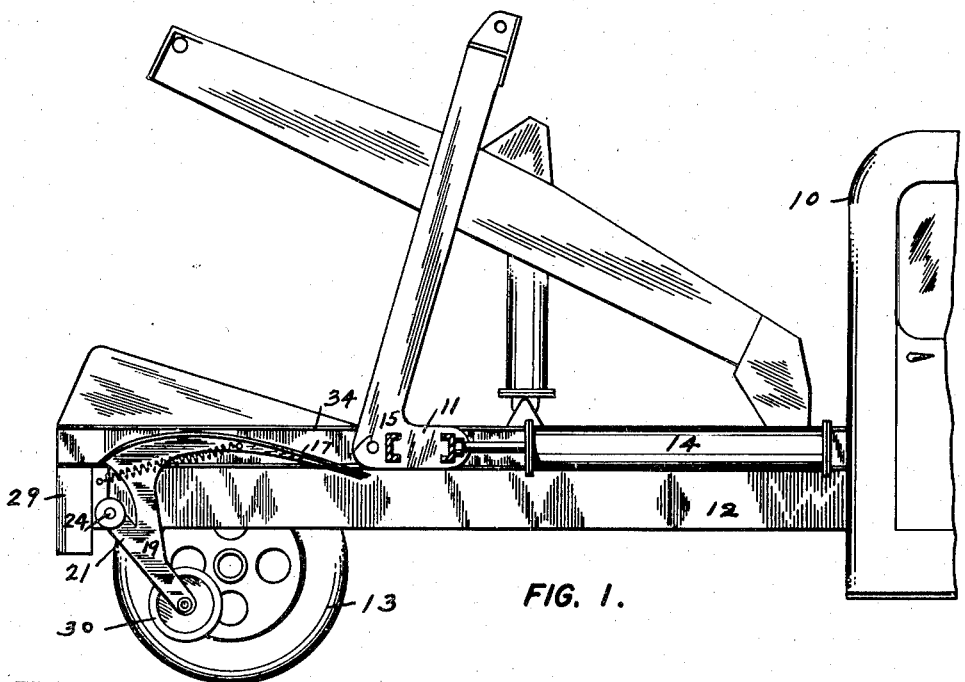
Figure 1 is a sectional elevation taken through the longitudinal center line of a conventional dump truck showing the anti-tilt mechanism embodying this invention, with the anti-tilt wheels in raised position.

Referring to the structure shown in the drawings, an anti-tilt mechanism is illustrated in use with a conventional dump truck 10 including the dump operating mechanism consisting mainly of the construction shown in Patent Number 2,281,183 issued to George R. Dempster, April 27, 1940, in which similarly a skid traveller 11 is used on the chassis, 12. Each traveller 11 reciprocates longitudinally across the chassis 12 in tracks 34 from the middle to the rear and over the rear wheels 13 of the truck 10. The traveller is actuated by cylinder mechanism 14 preferably by a hydraulic medium. The front portion of the traveller 11 is arranged with a buffer edge 15 that serves to engage the upper sliding surface 16 of an arcuate flange 17 mounted on a structural rib member 18 of tapered form. The structural rib 18 is coupled with a radial arm 19 having a bearing member 20 on its lower end portion and an extension limb 21 laterally connected to it. The member 20 is bored to take a shaft 22 which supports caster wheels 30 which revolve on it. The extension limb 21 is pivotally connected to an angle frame 26 by a pin 24. This angle frame 25 is connected to the chassis and is adapted to hold the end of a coil spring 27 which is tensioned to normally restrain the anti-tilt arm 19 against the channel 29 at the back of the chassis 12. The pin 28 holds the spring 27 towards the end of the structural rib member 18 so as to give the appropriate operational action. This action can be appreciated from the drawings and requires that the spring be extended when the arm with rib member and flange are revolved downwardly and backwardly about the pin 24.

Figure 2:
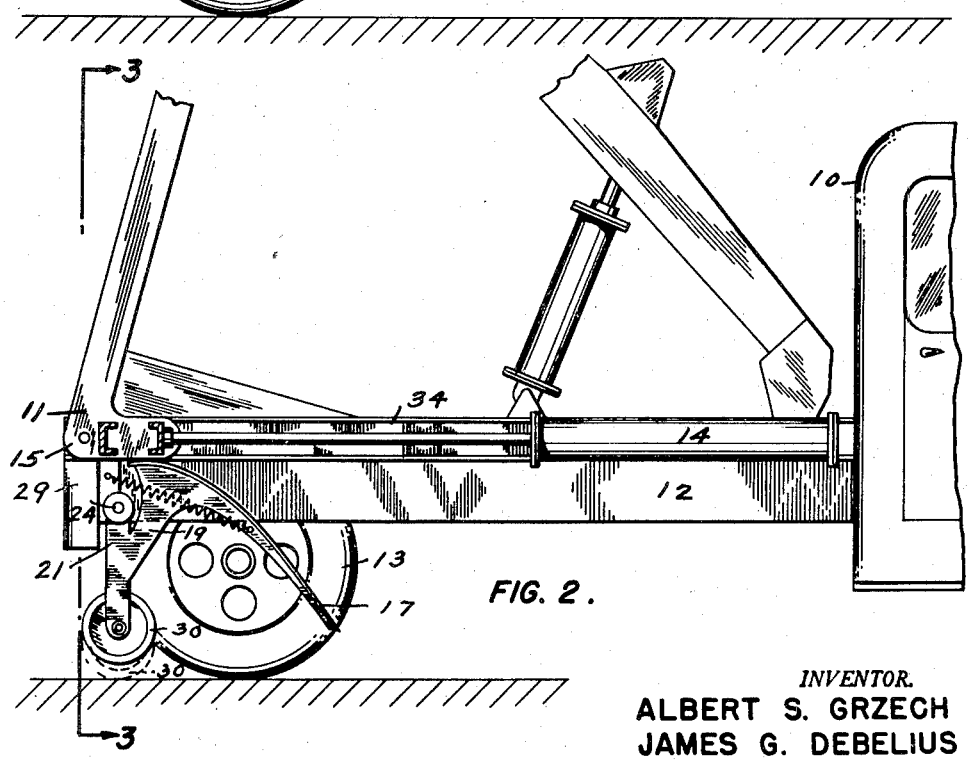
Figure 2 is a view similar to that shown in Figure 1, taken along line 2—2 of Figure 3, with the anti-tilt wheels in lowered position before contacting the ground, the dotted outline shows the position when the wheels reach the ground, during the dumping of a load.
Figure 3:
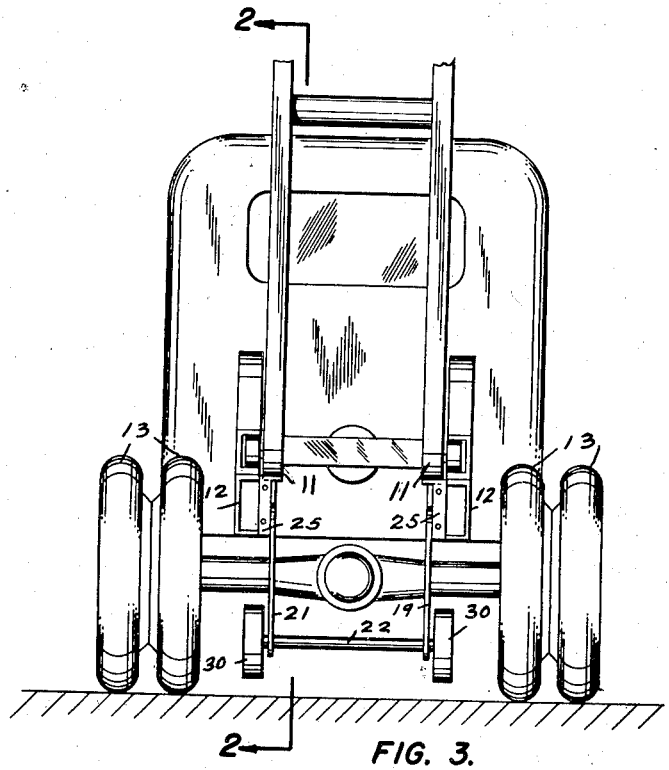
Figure 3 is a sectional end view taken along line 3—3 of Figure 2.
Figure 4:
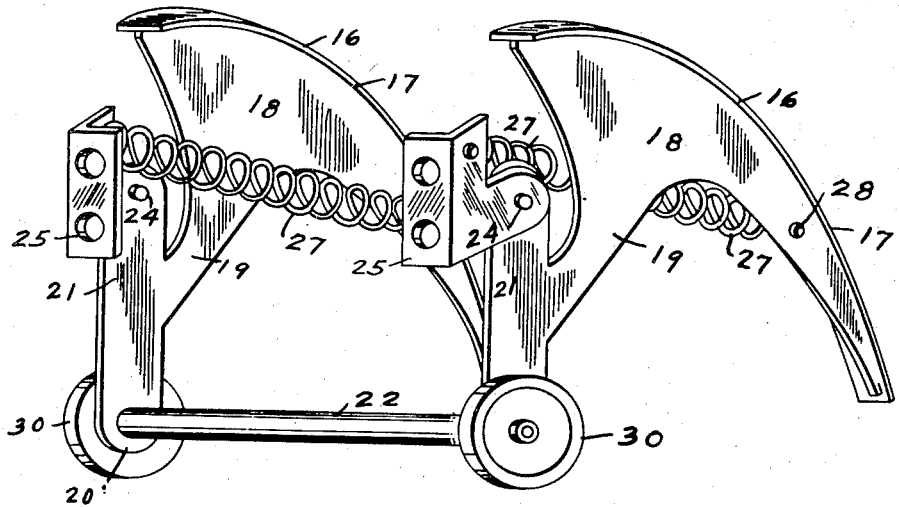
Figure 4 is a perspective view of the anti-tilt mechanism.

The channel 29 is at the end of the travel stroke of the traveller 11 towards the rear of the truck, when the dump mechanism is in discharging position. When the anti-assembly is pulled back by the spring 27 to the position shown in Figure 1 when the dump mechanism traveller 11 is in non-dumping position, the assembly has its caster 30 raised above the roadway and inoperative as a support. When the traveller 11 is moved backwardly so it engages the rim member 16 and runs on it, it revolves the arm 19, as indicated, and by reason of the weight or force, it acts with thereon, induces the anti-tilt assembly to lower its casters 30 by revolving them to the position shown in Figure 2 and brings the caster 30 close to but not touching the roadway. The rim member 16 is ordinarily positioned above the normal travel level of the traveller 11 a predetermined amount, to suit the movement of the assembly. The amount of this difference in levels compared with the length of the rim member 16 on which the traveller passes indicates the gain in power attained over the force exerted by the traveller. Thus if the level of the rim is six inches above the normal level of the traveller rails, and the rim member is two feet long, the gain in power is four times that of weight exerted by the weight of the traveller, without regard to the action produced by the pivoting of the arm 19 on the pin 28. The caster 30 are left in operative position above the roadway level should the weight of the load on the back not be sufficient to tilt the truck, but should the latter tilt, even slightly, the casters 30 will support the weight and prevent the truck from tilting further. The position of the anti-tilt assembly on the chassis is important, as it is necessary that the casters be so aligned that they will take up the load in a position a sufficient distance behind the regular wheels 13 to offset fulcrum effect of the latter when the load is behind them on the truck. In other words the casters serve with their supporting arms to act as a leverage arm sufficient to meet any tendency of the truck to tilt up at the front further than that allowed by the casters, which is comparatively little. The spring 27 automatically returns the anti-tilt assembly to its normal position as the traveller 11 returns to its normal position. The force acting on the casters 30 and arms 19 is transmitted directly at right angles from the ground compressively to the chassis so that there is no tendency to so bend the assembly back that might make it fail.

Should the weight of the truck load become excessive so as to tilt the truck up at the front before the traveller was entirely back at the rear end of its stroke the assembly will still work and the leverage action of the traveller on the rim member will continue to force the casters 30 along the roadway under the truck until they are directly under the pivot 24, as the traveller progresses backwardly.

The assembly itself is very simple in structure, in this particular form. It avoids the use of gears and other interlocking mechanisms and simply requires that the traveller 11 slide over it to make it work effectively and automatically with the raising of the dumping machinery of the truck. It can be constructed as a unit, to be placed on a truck very easily, as only the attachment of the angle-frame 25 to the channel 29 by bolts is necessary. The traveller 11 and the other parts mentioned come as regular equipment in the above mentioned patent.

While but one general form of the invention is shown in the drawings and described in the specifications, it is not desired to limit this application for patent to this particular form or in any other way otherwise than limited by the scope thereof, as it is appreciated that other forms of construction could be made that would use the same principles and come within the scope of the appended claims.

Having thus described the invention, what is claimed is:

1. In combination with a vehicle having a dumping mechanism, an anti-tilt assembly comprising in combination, a rim member normally arranged at an angle to the travel of said mechanism but in contact with same, an arm supporting said rim and guiding it through a predetermined line of travel, and means on said arm for engagement with the roadway on which the vehicle is positioned actuated by said arm to take up weight on the vehicle tending to tilt same, said rim member being actuated by the mechanism sliding on same during its operation, the weight thereon forcing the assembly to operate the means as the mechanism slides on the rim member during its travel.

2. In combination with a vehicle having a dumping mechanism operating thereon, an anti-tilt assembly comprising in combination, a moving rim member, an arm for supporting said rim member and controlling its movement, caster means on said arms and moving therewith adapted for supporting under said truck, means for supporting said arm to the truck and enabling it to operate thereon, said member being arranged to align with said mechanism to enable it to slide thereon and depress it during the operation of said mechanism and bring the casters to a supporting position under the truck as the dumping mechanism assumes its maximum discharge.

3. In combination with a vehicle having a dumping mechanism operating thereon, an anti-tilt assembly comprising in combination, a moving rim member, an arm for supporting said rim member and controlling its movement, caster means on said arms and moving therewith adapted for supporting under said truck, means for supporting said arm to the truck and enabling it to operate thereon, said member being arranged to align with said mechanism to enable it to slide thereon and depress it during the operation of said mechanism and bring the casters to a supporting position under the truck as the dumping mechanism assumes its maximum discharge, and means connected with said assembly and the truck for returning it to normal position as the mechanism returns to normal position.

4. In combination with a truck having dumping mechanism having a traveller provided therewith, an anti-tilt assembly comprising in combination, a rim member or arcuate form, an arm supporting said member and arranged to guide it in an arcuate path, means for pivoting said arm to said truck, caster means on the arm for engagement with the floor on which the wheels of the truck rest and to take up the weight thereon when so positioned so the truck cannot tilt backwardly, said member being arranged in the path of the traveller of said mechanism so as to be pressed down thereby and rotate it with the arm and force the caster into floor engagement position, and a spring fastened to the truck and said arm to return the assembly into normal position when the traveller is in normal position.

5. In combination with a truck of the class described an anti-tilt assembly comprising an arcuate rim member with its upper surface arranged for contact with a dumping mechanism used on the truck to depress it when in operation, an arm rotatably supporting said member and giving it an arcuate movement beneath the mechanism throughout its operation, caster means on the arm for approachment to the ground on which the truck is supported in proportion to the movement of the mechanism and the travel of the member.

6. In combination with a truck of the class described an anti-tilt assembly comprising an arcuate rim member with its upper surface arranged for contact with a dumping mechanism used on the truck to depress it when in operation, an arm rotatably supporting said member and giving it an arcuate movement beneath the mechanism throughout its operation, caster means on the arm for approachment to the ground on which the truck is supported in proportion to the movement of the mechanism and the travel of the member, and spring means for keeping the arm and member under tension during their operation and to automatically return same as the mechanism returns to its normal inoperative position.

ALBERT SAMUEL GRZECH.
JAMES G. DEBELIUS.